United States Patent
Shepherd

[15] 3,658,502
[45] Apr. 25, 1972

[54] METHOD OF FORMING WELDED MULTIPLE GLAZING UNITS

[72] Inventor: Gerald Shepherd, St. Helens, England
[73] Assignee: Pilkington Brothers, Limited, Liverpool, England
[22] Filed: Sept. 8, 1969
[21] Appl. No.: 855,873

[30] Foreign Application Priority Data

Sept. 9, 1968 Great Britain..................42,851/68

[52] U.S. Cl.......................................65/58, 65/115, 65/152
[51] Int. Cl. .................................................C03b 23/24
[58] Field of Search ............................65/58, 152, 348, 115

[56] References Cited

UNITED STATES PATENTS

| | | |
|---|---|---|
| 2,080,083 | 5/1937 | Magnien...................................65/348 |
| 2,624,979 | 1/1953 | Clever et al............................65/58 X |
| 2,761,249 | 9/1956 | Olson et al.............................65/58 X |
| 3,333,936 | 8/1967 | Warren..................................65/348 X |
| 3,469,963 | 9/1969 | Beattie.....................................65/115 |

*Primary Examiner*—Arthur D. Kellogg
*Attorney*—Sughrue, Rothwell, Mion, Zinn & Macpeak

[57] ABSTRACT

The invention relates to the manufacture of a welded multiple glazing unit. The margins of an assembly of glass sheets are first united by a peripheral weld. The peripheral weld is then force cooled to a temperature in the region of the annealing temperature of the glass.

3 Claims, 10 Drawing Figures

Patented April 25, 1972
3,658,502
2 Sheets-Sheet 1
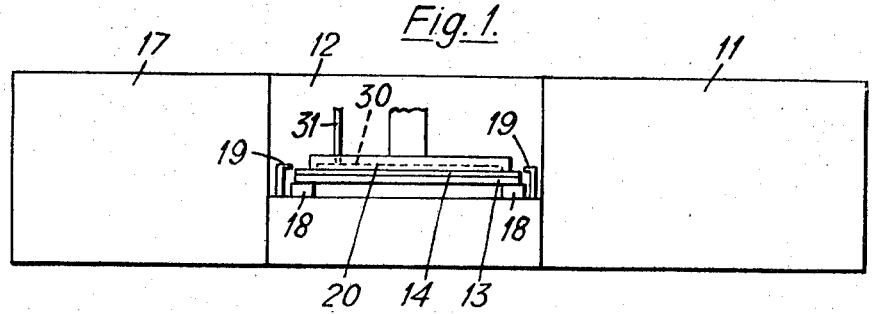
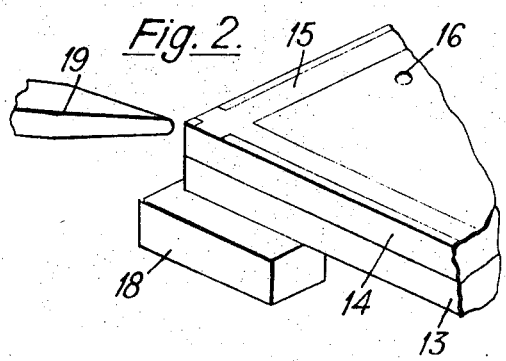
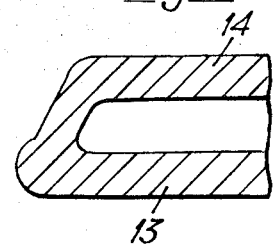
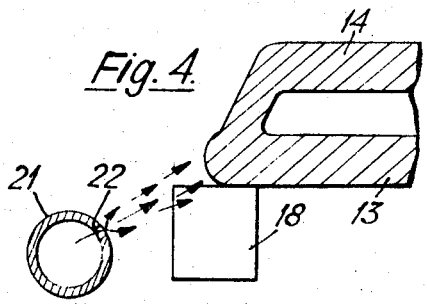
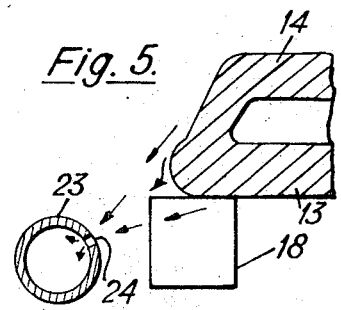

Patented April 25, 1972 3,658,502

METHOD OF FORMING WELDED MULTIPLE GLAZING UNITS

BACKGROUND OF THE INVENTION

1. Field of the Invention

The present invention relates to the manufacture of welded multiple glazing units.

2. Description of the Prior Art

In the manufacture of all-glass welded multiple glazing units, such as double glazing units, sheets of glass to form a unit are cut to size, cleaned, assembled, pre-heated, welded together at their peripheries, and drawn apart to establish an air space between adjacent sheets whilst the peripheral weld is still soft and capable of retaining a continuous connection of the sheet peripheries. The unit so formed is annealed, and then flushed with gas to reduce the moisture content of the air space before the air space is sealed from atmosphere. A hole drilled in one of the sheets before the sheet is pre-heated permits air to enter the air space whilst the sheets are being drawn apart and the hole also permits the air space to be flushed with the dry gas. After the flushing operation the hole is closed with a sealing glass, resin, or other suitable material.

In plant for the peripheral welding of glass sheets for all-glass welded multiple glazing units the pre-heated, assembled sheets are delivered to and deposited at the welding station, the edges of the glass sheets are heated until they unite, the sheets are drawn apart to establish the air space, and the welded glass sheets must be held apart until the peripheral weld loses sufficient heat and becomes sufficiently rigid to be self supporting. The welded unit can then be removed from the welding station. The time required at the welding station is the longest time of the whole time cycle, during which an assembly or welded unit is static.

It is a main object of the present invention to reduce the time taken at the welding station, and thus increase the output of welded glazing units from the process.

SUMMARY

A welded multiple glazing unit is manufactured by presenting an assembly of glass sheets for example two sheets stacked are on top of the other, to a welding station. The margins of the sheets are then welded to unite the sheets in spaced apart relation by a peripheral weld. The welded periphery of the assembly is then force cooled by conducting heat away from the welded region.

Control of the forced cooling avoids the creation of undesirable stresses in the glass.

The welded periphery is cooled to a temperature at least equal to the strain point of the glass.

BRIEF DESCRIPTION OF THE DRAWINGS

FIG. 1 shows diagrammatically by way of example a production line for the manufacture of all-glass welded double glazing units, FIG. 2 is a perspective view of a support for a corner of an assembly of glass sheets in the welding position, FIG. 3 is a section through one side region of a welded double glazing unit, FIG. 4 is a section through one embodiment of a forced cooling arrangement according to the invention operating on the peripheral weld of a welded unit, FIG. 5 is a section through a second embodiment of a forced cooling arrangement for the peripheral weld.

DESCRIPTION OF THE PREFERRED EMBODIMENT

Figure 6:
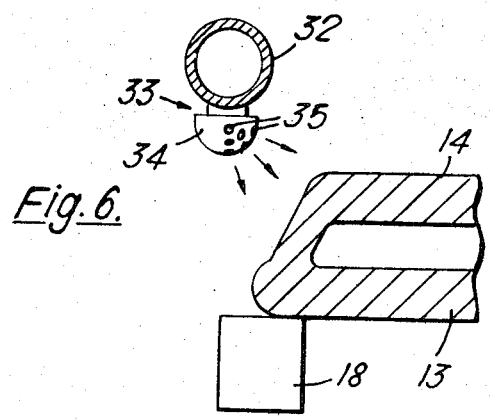
FIG. 6 is a section through a third embodiment of a forced cooling arrangement for the peripheral weld, the arrangement including four gas diffusers positioned adjacent to the four corners of the weld.

In the production line illustrated in FIG. 1, block 11 indicates the location of glass drilling, washing, drying, striping, pre-heating, and conveying means which delivers into a welding station 12 two overlying glass sheets 13 and 14 which have been pre-heated to a temperature of about 550° C and with the margins of the top sheet 14 striped on its top surface with an electrically conducting material 15. A hole 16 is drilled adjacent one of the margins of the sheet 14 inwardly of the electrically conducting stripe material 15. The electrically conducting material 15 is usually of colloidal graphite which is painted on to the top sheet 14 before the sheets are pre-heated.

The block 17 represents an annealing lehr, air space drying, hole sealing apparatus and conveying means for removing welded units from the welding station 12 and for conveying the welded units through the annealing lehr, and the subsequent apparatus of the production line.

At the welding station 12, the assembled overlying sheets 13 and 14 are placed on and supported by blocks 18 with electrodes 19 close to each corner of the assembly 13, 14, see especially FIG. 2. When an assembly of sheets 13, 14 is thus deposited at the welding station 12, the welding operation proceeds.

A vacuum platen 20 located above the assembly 13, 14 and connected to a lifting and lowering jack in well known manner, is lowered into contact with the upper face of the top sheet 14 and recesses 30 in the under face of platen 20 are connected to a vacuum source by a duct 31 so that sheet 14 is clutched to platen 20.

A heating current is then passed successively between adjacent electrodes 19 through the electrically conductive stripes material 15 so that the four margins of the sheet 14 are successively heated. Current flow through the stripes material 15 causes the glass beneath the stripes to be heated and when the glass becomes electrically conductive the temperature rises further and the stripes burn off and the heating current is conducted through the heated margins of the sheet 14.

The four side edge regions or margins of sheet 14 are heated successively by switching the electrical heating current cyclically between the electrodes 19 until the entire marginal region of the sheet 14 is brought to a melted condition. The margins of sheet 13 have meanwhile been softened by conduction from sheet 14, and the softened margins of the assembled sheets 13 and 14 then run together to constitute a peripheral weld uniting the sheets 13 and 14.

When the molten margins of sheets 13 and 14 have united, the platen 20 is raised, to lift the top sheet 14. The bottom sheet 13 remains on the support blocks 18 due to gravity, and the welded edge region is stretched as the desired air space is established between the sheets 13 and 14. The hole 16 in sheet 14 permits air to flow into the air space as the sheets 13 and 14 are drawn apart so that the pressure in the air space remains equal to atmospheric pressure. If desired, vacuum means may be provided for positively holding the bottom sheet 13 on the support blocks 18 while the top sheet 14 is being raised.

The sheets 13, 14 must then be held static until the welded margins of the unit lose heat and solidify. When the weld is sufficiently solid to be capable of supporting the unit without any deformation, the vacuum is released from the platen 20, sheet 14 is released, and the platen is lifted clear of the assembly to permit the unit to be transported out of the welding position 12 and into the apparatus represented by block 17 for further processing.

Hitherto the welded edge has been allowed to cool by radiation and conduction to the surrounding atmosphere so that the rate of edge cooling has been slow and platen 20 often has to support the sheet 14 for periods in excess of 40 seconds before the welded edge is sufficiently set so as to be capable of supporting the unit.

The present invention provides for force cooling of the peripheral weld so as to reduce the cooling time period.

With reference to FIG. 4, gas supply ducts 21 are positioned adjacent to the support blocks 18 so as to lie parallel to each side of the assembly of glass sheets. Each of the ducts 21 has small holes 22 therein directed towards the peripheral weld. Hot gas under pressure is supplied to the ducts 21 from a source (not shown) and the gas flows through holes 22 and forms streams of gas impinging on and flowing over the hot welded sides of the unit.

To prevent localized overcooling creating undesirable temporary or permanent stresses in the welded unit, the gas supplied to ducts 21 is heated so that the temperature of the flows contacting the glass is at or near the temperature to which the glass was pre-heated prior to the welding operation. The hot gas flows over the peripheral weld and force cools the weld to a temperature in the region of the annealing temperature for the glass. At this temperature the glass is sufficiently strong to support the unit and the unit can be moved from the welding station into the annealing lehr. The upper sheet 14 can then be released from the platen 20.

The welding station 12 is totally enclosed to avoid heat losses to atmosphere, but the welding station is open to the pre-heat oven at location 11 at least during the transfer of pre-heated glass sheets to the welding station. The atmosphere at the welding station is also heated by the hot glass so that in practice the ambient temperature at the welding station is in the region of the annealing temperature of the glass.

FIG. 5 illustrates a modification of the apparatus of FIG. 4. A duct 23 adjacent each side of the peripheral weld has holes 24 therein directed towards the welded side edge. By connecting ducts 23 to a low pressure source, welding station atmosphere is drawn through the holes 24 into the ducts 23 thus creating flows of welding station atmosphere over the weld. This flow of welding station atmosphere over the hotter peripheral weld causes forced cooling of the weld towards the ambient temperature at the welding station.

The ducts 21 and 23 are positioned just below the upper surfaces of the support blocks 18 to avoid interference with the glass assembly during passage into and out of the welding station.

Figure 7:
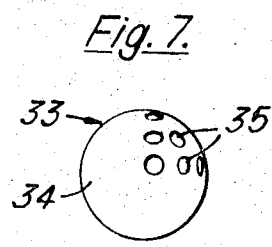
FIG. 7 is an underplan of each diffuser of the arrangement shown in FIG. 6.
Figure 8:
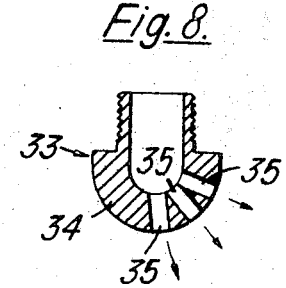
FIG. 8 is a vertical section though each diffuser of the arrangement shown in FIG. 6.

With reference to FIGS. 6 to 8, gas circulating ducts 32 are positioned above the welded unit and have four downwardly extending diffusers 33 adjacent the corners of the peripheral weld. Each diffuser 33 has a hemispherical end 34 having six gas discharge, radial apertures 35 spread over the quadrant of the end which faces the respective corner of the peripheral weld. Gas from the ducts 32 is thus directed by the diffusers in a generally downwardly direction and towards and along the welded side edges.

Figure 9:
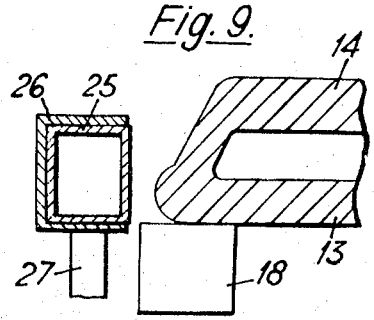
FIG. 9 is a section through another embodiment of a cooling arrangement for the peripheral weld.
Figure 10:
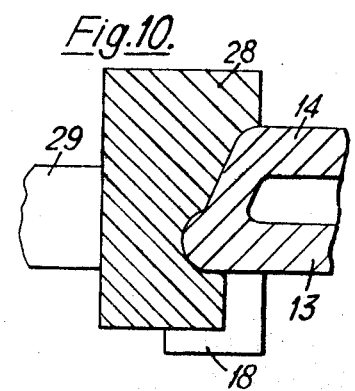
FIG. 10 shows a section through a further embodiment of a cooling arrangement for the peripheral weld.

FIG. 9 shows another way of rapidly reducing the temperature of the peripheral weld. In this embodiment a rectangular section duct 25 is positioned adjacent the support blocks 18 so as to face the peripheral weld. A cooling fluid is circulated through the duct 25 so that the duct presents a cooled face to the peripheral weld which absorbs radiant heat from the weld. To avoid undue extraction of heat from the welding station atmosphere, the faces of duct 25 not directly facing the welded side edge are coated with a heat insulating material 26.

The duct 25 is supported by posts 27 which connect to a lifting and lowering mechanism, not shown, so that duct 26 can be elevated to an operative position after the glass has been welded and lowered to its normal inoperative position where it will not interfere with movement of the glass assembly to and from the welding station.

Another embodiment for force cooling the peripheral weld is illustrated in FIG. 7. Carbon blocks 28 mounted on sliding support members 29 are movable into and out of engagement with the peripheral weld of the unit 13, 14. The blocks 28, four of which are provided co-operating with the four sides of the unit, have their front faces recessed to conform with the configuration of the outer faces of the weld.

As the blocks 28 lie permanently within the welding station they are at the temperature of the station atmosphere, and these blocks 28 are moved by members 29 into contact with the heated weld to absorb heat therefrom after the sheets have been drawn apart, and thus rapidly reduce the temperature of the weld to the temperature of the atmosphere in the welding station. The blocks 28 can further assist in imposing a desired form on the welded edge.

The blocks 28 are moved into engagement with the welded side edges for a very brief period sufficient to cool the weld and are then rapidly retracted to permit the unit to be moved from the welding station. During the periods of non-contact with a welded unit the blocks 28 lose heat to the station atmosphere and are thus prepared for the next force cooling operation on the next assembly of glass sheets to be welded.

The present invention thus reduces the dwell period of a glass assembly and the welded units subsequently formed therefrom, in the welding station by reducing the cooling period following marginal welding of the sheets. In practice using the arrangement of FIG. 4, a cooling time of less than 30 seconds has been achieved.

Also, it is desirable that the welded periphery is not cooled to a temperature below the strain point of the glass. Thus the welding chamber atmosphere is maintained at a temperature at least equal to the strain temperature of the glass.

I claim:

1. A method of manufacturing a welded multiple glazing unit, comprising the steps of presenting an assembly of polygonal glass sheets to a welding station, welding together the margins of the sheets whereby the sheets are united in spaced-apart relation by a peripheral weld, and force cooling the welded periphery of the assembly by blowing cooling gas toward the corners of the weld in a manner to contact the corners of the weld and then diffuse the gas along the side edges of the weld and at a rate of flow of the cooling gas sufficient to compensate for the increased temperatures at the corners as compared to the temperature of the major portion of the side edges.

2. A method of manufacturing a welded multiple glazing unit comprising the steps of presenting a preheated assembly of polygonal glass sheets to a welding station, heating the sides of the assembly to soften the margins of the sheets and to form a peripheral weld uniting the sheets, drawing the sheets apart to establish an air gap therebetween, force cooling the welded periphery of the assembly by blowing cooling gas toward the corners of the weld in a manner to contact the corners of the weld and then diffuse the gas along the side edges of the weld and at a rate of flow of the cooling gas sufficient to compensate for the increased temperatures at the corners as compared to the temperature of the major portion of the side edges, without cooling the welded periphery below the strain temperature of the glass, and then annealing the welded assembly to produce the desired stress distribution in the unit.

3. A method according to claim 1 wherein the temperature of the cooling gas is about 550° C.

* * * * *